Nov. 2, 1965  A. R. THOMPSON  3,215,962
TANGENT OUTPUT TRANSDUCER
Filed Jan. 8, 1963

INVENTOR.
ALLAN R. THOMPSON
BY William J. Flynn
ATTORNEY

United States Patent Office 3,215,962
Patented Nov. 2, 1965

3,215,962
TANGENT OUTPUT TRANSDUCER
Allan R. Thompson, Westlake, Ohio, assignor to Clevite Corporation, a corporation of Ohio
Filed Jan. 8, 1963, Ser. No. 250,124
1 Claim. (Cl. 336—30)

This invention relates to a position-responsive transducer or measuring device.

In United States Letters Patent Nos. 2,631,272, 2,697,214, 2,700,758 and 2,981,909, there have been disclosed various embodiments of a measuring device or transducer which produces an electrical output signal whose magnitude is a measure of the displacement of a movable element from a predetermined null or "zero" position.

The transducer has a ferromagnetic core providing two alternate paths for magnetic flux and a portion common to both flux paths, an air gap at said common portion, primary winding means on the core, secondary winding means having two different portions on the core at said two alternate flux paths and connected in series opposition, and a flux barrier movable in the air gap to control the division of flux between the two alternate flux paths in the core. The flux barrier is in the form of a shorted turn or loop of electrically conductive, non-magnetic material. When a suitable A.C. excitation signal is applied to the primary winding means, the net output voltage appearing across the secondary winding means is a measure of the displacement of the flux barrier loop from a predetermined null position along the air gap, in which the voltage induced across the two different portions of the secondary winding means cancel each other.

Prior to the present invention such transducers were designed to have, as closely as possible, a linear response characteristic. That is, the output voltage was a straight-line function of the input information signal which produces the displacement of the flux barrier loop from its null position along the air gap. If the air gap was straight from end to end, the flux barrier loop was mounted for movement in a straight line along the air gap. If the air gap was arcuate from end to end, the flux barrier loop was mounted for movement arcuately along the air gap. In either case, the transducer had a substantially linear characteristic.

For certain practical applications of such transducers it is desired to have an output signal which is a tangent function of the input information signal. For example, an edge-writing oscillograph records a visual record trace which varies as the tangent of the angular movement imparted to its rotary input shaft. This angular movement is a linear function of the amplitude of the input signal to the oscillograph. Position-responsive transducers have been used in conjunction with oscillographs to provide a feedback "position voltage" whose purpose is to insure that the position of the recording pen will correspond precisely to the amplitude of the input information signal to the oscillograph. However, prior to the present invention there has been no effective and simple position feedback transducer for tangent function, edge-writing oscillographs.

It is the principal object of this invention to provide a novel and improved position-responsive transducer having a tangent output characteristic, that is, an output which varies as the tangent of the input information signal to the transducer.

It is also an object of this invention to provide such a transducer which is reliable and relatively simple and inexpensive in its construction and mode of operation.

Further objects and advantages of this invention will be apparent from the following detailed description of a presently-preferred embodiment thereof, which is illustrated in the accompanying drawing.

Figure 1:
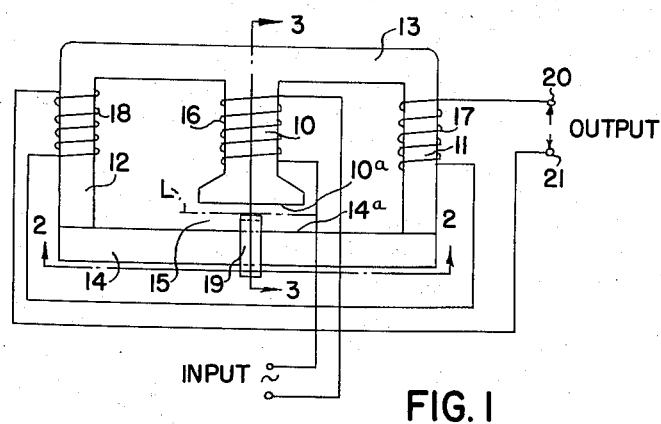
FIGURE 1 is a schematic elevational view of a transducer or measuring device embodying the present invention.
Figure 2:
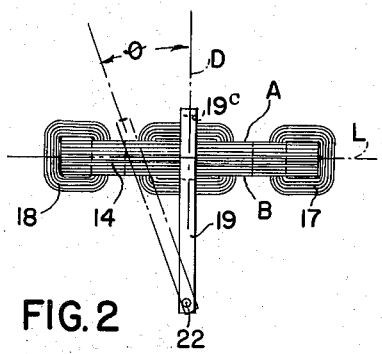
FIGURE 2 is a bottom plan view of the FIGURE 1 transducer, taken along the line 2—2 of FIGURE 1 and showing the movable flux barrier in its null position.
Figure 3:
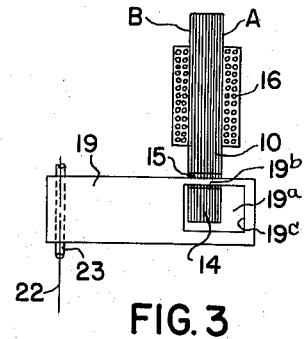
FIGURE 3 is a section taken along the line 3—3 in FIGURE 1 and showing the movable flux barrier in its null position.
Figure 4:
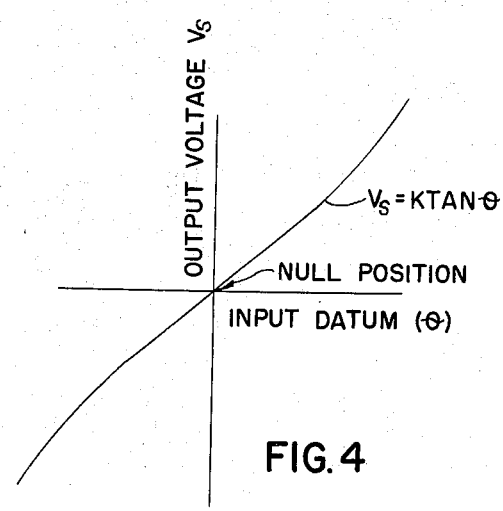
FIGURE 4 is a graphic representation showing the response characteristic of this transducer, showing its output voltage plotted as a function of its input information signal.

Referring first to FIGURE 1, the particular position-responsive transducer illustrated schematically therein is of the general type shown in U.S. Patents Nos. 2,207,248, 2,631,272, 2,697,214, 2,700,758 and 2,981,909. It comprises a ferromagnetic core having a center leg 10 and a pair of outer legs 11 and 12 on opposite sides of the center leg. At its upper end in FIGURE 1 the core has a top leg 13 joining the upper ends of both of the outer legs 11 and 12 to the upper end of the center leg 10. At its lower end in FIGURE 1, the core has a bottom leg 14 joining the lower ends of the outer legs 11 and 12 and spaced from the lower end of the center leg 10 by an air gap 15. As shown in FIGS. 2 and 3, the core preferably is made of thin, flat laminations and it presents planar major faces A and B. The confronting faces 10a and 14a of the core legs which define the air gap 15 are flat and are spaced apart equidistantly throughout the entire length of the air gap, preferably.

A primary winding 16 is wound around the center leg of the core. Secondary windings 17 and 18 are wound individually around the respective outer legs of the core. The secondary windings are connected in series bucking relationship. That is, the respective voltages induced across the individual secondary windings subtract, one from the other.

A movable flux barrier member 19 is disposed in the air gap 15. Preferably this flux barrier member is a shorted turn or loop of electrically conductive, non-magnetic material, such as copper or brass, extending loosely around the bottom core leg 14 and movable along the air gap 15, i.e., in a direction toward one or the other of the outer legs. In accordance with the present invention the flux barrier member is mounted for movement arcuately along the air gap, as described in detail hereinafter.

The two outer legs 11 and 12 and the respective adjoining portions of the top leg 13 provide two alternate paths for magnetic flux in the core, while the center leg 10 is common to both of these flux paths. The bottom leg 14 completes these two different flux paths through the core from the respective outer legs 11 and 12 back to the center leg 10 across the air gap 15.

In the operation of this transducer, when a suitable alternating current excitation signal is applied to the primary winding 16, alternating magnetic flux is induced in the center leg 10 of the core, flowing across the air gap 15 and dividing there, part going to the outer core leg 11 and the remainder going to the outer core leg 12 before returning via the top core leg 13 to the upper end of the center core leg 10. The flux in each outer core leg 11 or 12 induces a voltage across the corresponding secondary winding 17 or 18. Since the secondary windings are connected in series opposition, the net voltage across the secondary output terminals 20 and 21 is the difference between the individual voltages across the respective secondary windings 17 and 18.

The flux barrier member 19 tends to prevent any change in the flux linkages through itself. Therefore, it acts to prevent the flow of any appreciable amount of alternating flux through the bottom leg 14 of the core at the position of the flux barrier member 19. Accordingly, the position of the flux barrier member 19 along the air gap 15 determines the division of flux between the outer legs 11 and 12 of the core, and thus the respective magnitudes of the voltages induced across the individual secondary windings 17 and 18.

When the flux barrier member 19 is centered mid-way along the air gap, the flux will divide equally between the respective outer legs 11 and 12 of the core. If, for example, the respective secondary windings 17 and 18 are identical, then the voltages induced across them will be equal and, since the secondary windings are connected in series bucking relationship, the net output voltage will be zero. Therefore, this centered position of the flux barrier member in the particular example under discussion is a null or zero output position.

When the flux member 19 is positioned to one side or the other of this centered position, the flux across the air gap 14 will divide between the respective outer core legs 11 and 12 in proportion to the displacement of the flux barrier member 19 along the air gap from its null position. Consequently, in the particular example where the secondary windings are identical, the voltage induced across one of the secondary windings will be greater than the voltage induced across the other secondary winding, so that some finite net voltage is produced across the output terminals 20 and 21. The phase of this net voltage indicates the direction of the off-center position of the flux barrier member 19. The magnitude of this net voltage is proportional to the displacement of the flux barrier member 19 lengthwise of the air gap from its null position.

Referring to FIGURES 2 and 3, the flux barrier member 19 is pivotally mounted to turn on a fixed axis 22 located at one side of the core of the transducer and spaced from the air gap 15. This pivot axis lies in a plane extending perpendicular to the length L of the air gap 15 at the null location of the flux barrier along the air gap. Preferably, as shown in FIGURES 2 and 3, the pivot axis 22 for the flux barrier extends perpendicular to a straight line passing through the null position along the air gap in a direction perpendicular to the length L of the air gap. A rotary shaft 23 supports the flux barrier to turn on this axis 22. As shown in FIGURES 2 and 3, the flux barrier member 19 (the solid line null position in FIGURE 2) defines the plane in which the axis 22 lies. As shown in FIGURES 2 and 3, the axis 22 is offset to the side of the ferromagnetic core and it extends parallel to the plane of the core.

As shown in FIGURE 3, the flux barrier 19 is an elongated flat piece having a rectangular opening 19a which passes the core leg 14 and is substantially larger than the cross-sectional size of the latter. A narrow segment 19b of the flux barrier at the top of this opening 19a in FIG. 3 is disposed in the air gap 15. In the null position of the flux barrier, as shown in FIGURE 3, the edge 19c of the opening 19a which is remote from the pivot axis 22 has a substantial clearance from the face of the core leg 14 nearest it. With this arrangement, the free end of the flux barrier 19 can move arcuately through a substantial angle in either direction from its null position before the core leg 14 will interfere with its movement.

The input information signal to the transducer is the angular (rotational) movement imparted to an input shaft 23 connected to the flux barrier 19 and rotatable on the the pivot axis 22.

With the arrangement shown, any particular input information signal, represented by the angle $\theta$ through which the input shaft 23 turns and through which the flux barrier 19 turns from its null position along the air gap 15, will cause the segment 19b of the flux barrier to move from the null position through a distance $K \tan \theta$ along the air gap 15, K being a constant. That is, the displacement of the flux barrier (from its null position) lengthwise of the air gap 15 will be proportional to the tangent of the angular magnitude of the input information signal, rather than linearly proportional thereto. Since the output voltage of the transducer, appearing across the output terminals 20, 21, is a linear function of the position of the flux barrier along the air gap 15 from its null position, this output voltage also is a tangent function of the input information signal.

It will be noted that this result is achieved without the necessity of a specially shaped air gap or electrical loading or extraneous circuitry. The core structure may be identical to that embodied in linear output transducers of this general type. The only change is in the configuration and mounting of the movable flux barrier 19, and these are so simple that they do not add significant difficulty or cost to the manufacture of the transducer.

While a presently-preferred embodiment of this invention has been shown and described, it is to be understood that various modifications which depart from the disclosed embodiment may be adopted without departing from the spirit and scope of this invention.

I claim:

In a position-responsive transducer comprising a magnetic core having a planar major face and having a linear air gap therein and having different magnetic portions which provide different flux paths extending through the core away from said air gap, primary winding means on the core for inducing flux therein to flow across said air gap, and secondary winding means having two different portions thereof on the core at said different flux paths and connected to produce an A.C. output signal proportional to the difference between the individual voltages induced across said different magnetic portions by the flux in said different paths, the improvement which comprises: angularly movable flux barrier means having a flux barrier portion thereof disposed in said air gap, said flux barrier portion having a null position along the air cap in which the output signal of the transducer is substantially zero, and said angularly movable flux barrier means including means pivotally supporting said flux barrier portion to turn on an axis extending at one side of the core and lying in a plane which extends perpendicular to the length of the air gap at said null position, and perpendicular to the said planar major face of said core.

References Cited by the Examiner

UNITED STATES PATENTS

| | | | |
|---|---|---|---|
| 2,207,248 | 7/40 | Garlick | 336—75 X |
| 2,700,758 | 1/55 | Smith | 336—75 X |
| 2,986,714 | 5/61 | Smith | 336—30 |

JOHN F. BURNS, *Primary Examiner.*

LARAMIE E. ASKIN, *Examiner.*